United States Patent [19]

Guardiani et al.

[11] Patent Number: 5,397,949
[45] Date of Patent: Mar. 14, 1995

[54] VIBRATION CANCELLATION APPARATUS WITH LINE FREQUENCY COMPONENTS

[75] Inventors: Richard F. Guardiani, Sewickley; Thomas L. Geiger, Valencia, both of Pa.

[73] Assignee: Westinghouse Electric Corporation, Pittsburgh, Pa.

[21] Appl. No.: 75,073

[22] Filed: Jun. 10, 1993

[51] Int. Cl.$^6$ .................................. H02K 7/065
[52] U.S. Cl. ............................ 310/51; 310/81
[58] Field of Search ......................... 310/51, 81

[56] References Cited

U.S. PATENT DOCUMENTS

| | | | |
|---|---|---|---|
| 3,088,062 | 4/1963 | Hudimac | 318/128 |
| 3,746,894 | 7/1973 | Dochterman et al. | 310/51 |
| 4,083,433 | 4/1978 | Geohegan, Jr. et al. | 188/1 B |
| 4,626,754 | 12/1986 | Habermann et al. | 318/460 |
| 4,908,536 | 3/1990 | Hudimac | 310/51 |
| 4,922,159 | 5/1990 | Phillips et al. | 318/128 |
| 4,947,067 | 8/1990 | Habermann et al. | 310/51 |
| 4,963,804 | 10/1990 | Geiger | 318/460 |
| 4,999,534 | 3/1991 | Andrianos | 310/90.5 |

Primary Examiner—Steven L. Stephan
Assistant Examiner—Judson H. Jones

[57] ABSTRACT

Vibration induced by electromagnetic forces at an AC power line frequency are cancelled using inertial masses that are oscillated at the line frequency, out of phase with the vibration induced by the electric power due to operation of a machine. The machine can be a rotating device such as a nuclear reactor coolant pump, that is vibrated at component frequencies and harmonics related to the rotational speed and line frequency as well as sum and difference frequencies due to beating of these frequencies together. Cancellation components at the line frequency and it harmonics minimize the generation of annoying sideband acoustic components, which also may contribute to hearing damage. The line frequency cancellation devices preferably include four inertial mass shakers mounted on the outside of the housing of the pump, at 90° intervals, each mass being displaceable in an oscillating manner along three perpendicular axes, for cancelling axial, lateral and torsional vibration coupled to the housing from the rotor. This mounting requires no penetration of the pressure barrier defined by the pump and plates the shaker mechanisms out of contact with heat, pressure and fluid conditions in the pump.

11 Claims, 2 Drawing Sheets

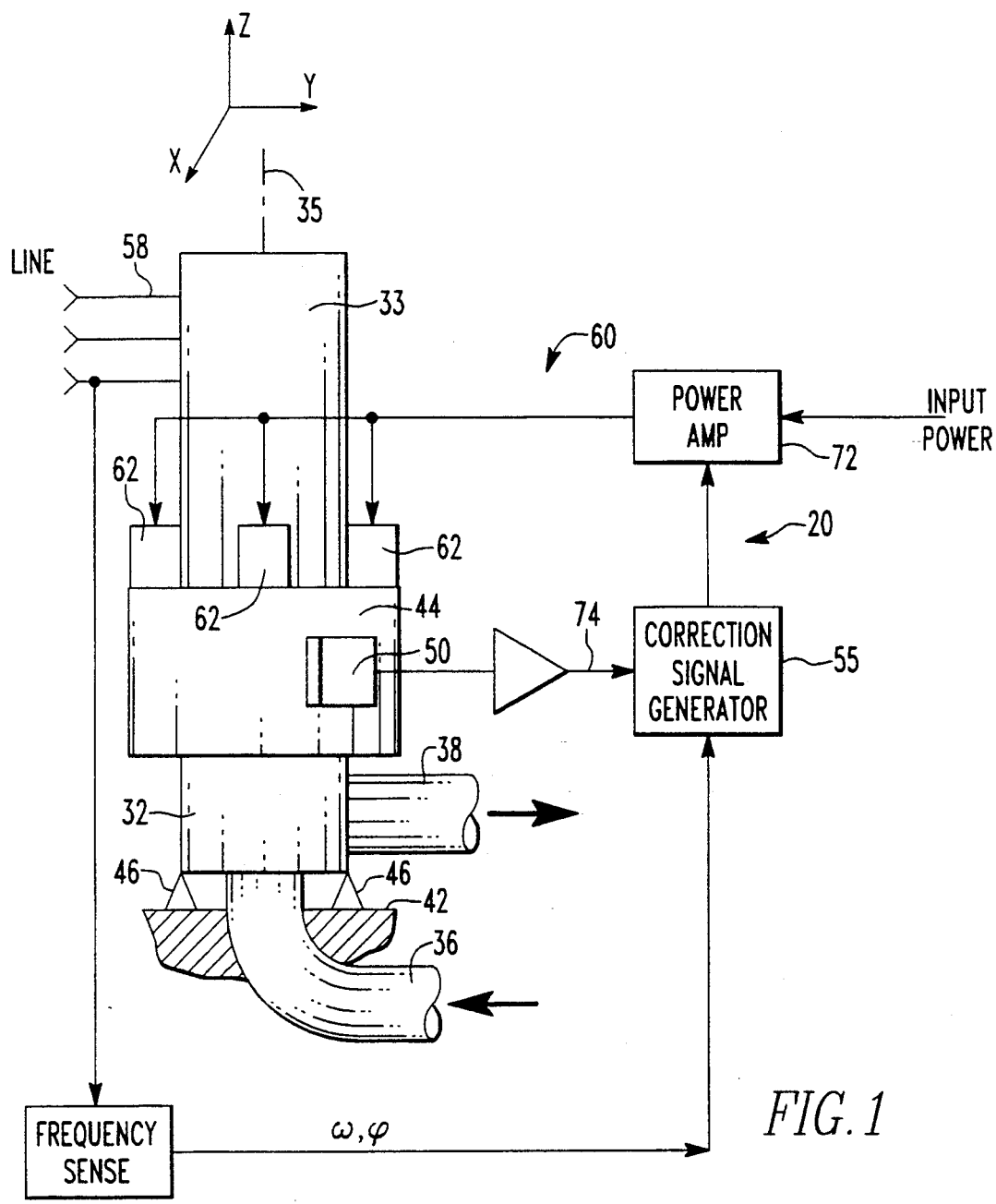
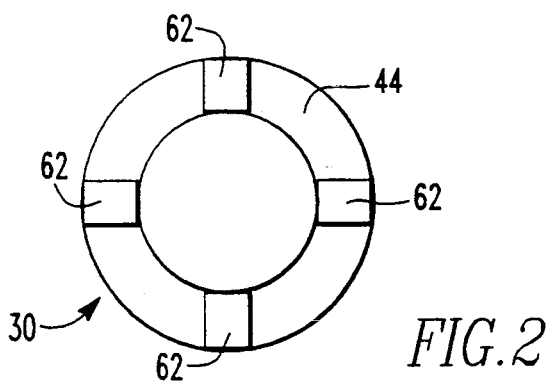
FIG.1
FIG.2

VIBRATION CANCELLATION APPARATUS WITH LINE FREQUENCY COMPONENTS

BACKGROUND OF THE INVENTION

1. Field of the Invention

The invention relates to cancellation of vibration in electrically powered devices, and in particular to a method and apparatus for reducing vibration and acoustic noise in an AC powered device by feedback of a corrective cancelling vibration related to the AC power line frequency.

2. Prior Art

Electrically powered devices vibrate due to imbalances such as eccentricities in rotating elements and translation of movable elements, and also due to periodic displacement of elements that normally are regarded as being stationary, such as the housing of a pump or motor or the foundation on which the device is mounted. One form of displacement in a rotating machine occurs at the rotation frequency. Another form of displacement occurs as a result of electromagnetic forces, which are at the power line frequency.

The electrical line frequency of a motor or the like is typically the frequency of the power grid, i.e., 60 Hz in the US or 50 Hz in Europe. An AC motor also may be coupled to a speed controller that produces a driving signal of variable frequency. For purposes of this disclosure, the electrical driving frequency of the motor is in any case termed the line frequency, it being understood that the electrical driving frequency may be different than the power line frequency that feeds the speed controller or the like.

The line frequency of a generator is the frequency of the signal generated by the machine, typically an integral multiple of the rotational frequency. Electrical and electronic equipment also vibrate at multiples or harmonics of their line frequency. This vibration produces acoustical noise that can be objectionable, especially in large or high powered devices.

In many cases, the vibration of equipment at multiples of the line frequency is more objectionable than vibration at the line frequency. For example, transformer "hum" occurs at twice the line frequency (i.e., 120 Hz) and can be annoying. The vibration and resulting acoustic noise are objectionable from the standpoint of occupational safety and health, especially for large transformers. Also, in rotating machines, vibrations at the rotating frequency (and at harmonics thereof) may beat against the line frequency and its harmonics, producing vibrations and noise at sideband frequencies related to the sums and differences of the respective frequencies. For example, a generator or motor may vibrate at and at multiples of the rotating frequency plus and minus one, two or more times the line frequency. The vibration and noise levels at these sideband frequencies can be objectionable for various reasons.

Depending on the element that is displaced (vibrated) in producing noise, one can attempt to limit vibration at various specific places in the noise producing device. For a transformer producing objectionable hum, all large plate structures radiating noise may require vibration elimination structures. A pump such as the coolant pump of a nuclear reactor may require structures attached to the motor pump housing. A generator or motor may require elimination of vibration coupled from the rotor to the foundation structures on which the device is mounted.

One means for dealing with vibration at rotational frequencies is to balance or support the rotating element of a generator or motor via electromagnetic bearings. The position of the rotor is sensed and applied to a feedback circuit. The feedback signal is applied via power amplifiers to modulate the balancing signal applied to the electromagnetic bearings to cancel vibration at the rotational frequency. Examples of this technique are disclosed, for example, in U.S. Pat. Nos. 4,999,534—Andrianos and 4,626,754—Habermann et. al. Generally, the correction signal applied to the bearings is in synch with the vibration frequency and out of phase. The correction signal in Habermann '754 is developed using one or several feedback loops. In Andrianos the correction signal is developed using adaptive controllers.

It is also known to cancel rotational vibrations by attaching to the vibrating element an electromagnetic shaker having a movable mass (i.e., a mass apart from the rotor or the like), and electromagnetically vibrating the mass. The mass is displaced in synch and out of phase with the vibration of the vibrating element. The forces producing vibration of the element are counteracted by the force produced by the vibrating mass. These forces are summed because the shaker and the vibrating element are attached. Examples of this technique are disclosed in U.S. Pat. Nos. 4,963,804—Geiger; 4,947,067—Habermann et. al.; 4,922,159—Phillips et. al.; 4,083,433—Geohegan, Jr. et. al.; and 3,088,062—Hudimac. Geiger and Habermann '067 employ shakers with a floating mass, thereby reducing friction, and displace the mass along three mutually perpendicular axes. Phillips and Hudimac teach particular feedback control couplings and equations for generating a correction signal. Each uses a circuit that is tuned to a particular vibration frequency, and therefore is arranged for operation at a particular rotation frequency of the machine.

It is possible to sum feedback signals from a number of parallel tuned circuits to handle harmonics. However, this is impractical if the number of frequencies to be handled becomes large. Such tuned circuits are not practical for a variable speed device, and in fact may introduce instabilities.

According to the present invention a correction signal is provided to handle vibration at the line frequency and its harmonics. The invention can be used in conjunction with a feedback apparatus operable at rotational frequencies as in U.S. Pat. No. 4,963,804—Geiger, to further cancel vibration by providing cancellation related to the line frequency applied to the pump motor. In that case, the components of the cancellation signals at rotational and line frequencies are summed or beat together in the same manner that the offending line and rotational vibratory frequencies and their harmonics are summed. The apparatus thus counteracts vibration at the line and rotational frequencies, at their harmonics, and at the sideband frequencies defined by their sums and differences.

To cancel vibration that is directed parallel to the rotation axis, lateral of the axis and rotationally around the axis, four shaker mechanisms are provided, each arranged for producing an oscillatory force in three mutually perpendicular axes. The four shaker mechanisms preferably are arranged at 90° intervals around the rotation axis of a rotating machine, being simply attached on the outside of the machine housing.

Accordingly, the invention is particularly applicable to controlling vibration of the liquid coolant pump of a nuclear reactor. No internal changes are needed in the pump and there is no requirement for additional penetration of the pressure barrier enclosing the coolant circuit. The shaker mechanisms are not subjected to extremes of heat and pressure or to exposure to the coolant fluid. The invention can counteract vibration over variable line frequencies and rotational speeds, and readily can be retrofit to a pump or the like.

SUMMARY OF THE INVENTION

It is an object of the invention to cancel vibration, particularly the sideband components of acoustic noise from vibration of a rotating machine, by coupling to the machine cancelling vibrations related to the line frequency.

It is another object of the invention to improve on vibration cancellation devices operable at rotational speeds, by summing vibration cancellation signals at line frequencies with the output of such devices.

It is a further object of the invention to improve on vibration cancellation devices using apparatus that can be simply and accessibly mounted on the external casing thereof.

These and other objects are accomplished according to the invention by minimizing or cancelling vibration induced by electromagnetic forces at an AC power line frequency. The vibrations at this frequency are cancelled using inertial masses that are oscillated at the line frequency, out of phase with the vibration induced by the electric power due to operation of a machine. The machine can be a rotating device such as a nuclear reactor coolant pump, that is vibrated at frequency components and harmonics related to the rotational speed and line frequency as well as sum and difference frequencies due to the beating together of these frequencies. Cancellation components at the line frequency and its harmonics minimize the generation of annoying sideband acoustic components, which might otherwise contribute to hearing damage. The line frequency cancellation devices preferably include four inertial mass shakers mounted on the outside of the housing of the pump or other rotating machine, at 90° intervals around the rotation axis, each mass being displaceable in an oscillating manner along three perpendicular axes, for cancelling axial, lateral and torsional vibration coupled to the housing from the rotor. This mounting requires no penetration of the pressure barrier defined by the pump and places the shaker mechanisms out of contact with heat, pressure and fluid conditions in the pump.

The invention is particularly applicable to large rotating machines such as the three phase motor/pump arrangement of a nuclear reactor liquid coolant pump, mounted at its base to a foundation and subject to vibration in torsion, axial displacement and lateral displacement relative to it mounting. Four independently controlled shaker mechanisms are driven by a driver in the same or in opposite directions. The driver is coupled to means for sensing the line frequency and to at least one accelerometer, via a correction signal generator that discriminates for vibration components at the line frequency and at harmonics of the line frequency, and drives the shakers so as to oppose these vibration components. Whereas the line frequency components are thereby reduced or eliminated, any beat frequency sidebands related to the line frequency vibrations are removed. The invention is advantageously used in conjunction with a vibration reduction mechanism that is responsive to vibration at rotational frequency components, and substantially improves the effectiveness of vibration reduction as a whole, by removing the complication of beat frequencies from issue.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a schematic side elevation view of a vertical axis pump/motor combination having vibration cancellation features according to the invention.

FIG. 2 is a top plan view of the apparatus of FIG. 1, showing the opposed mounting of the shaker devices.

DETAILED DESCRIPTION OF THE PREFERRED EMBODIMENTS

Figure 3:
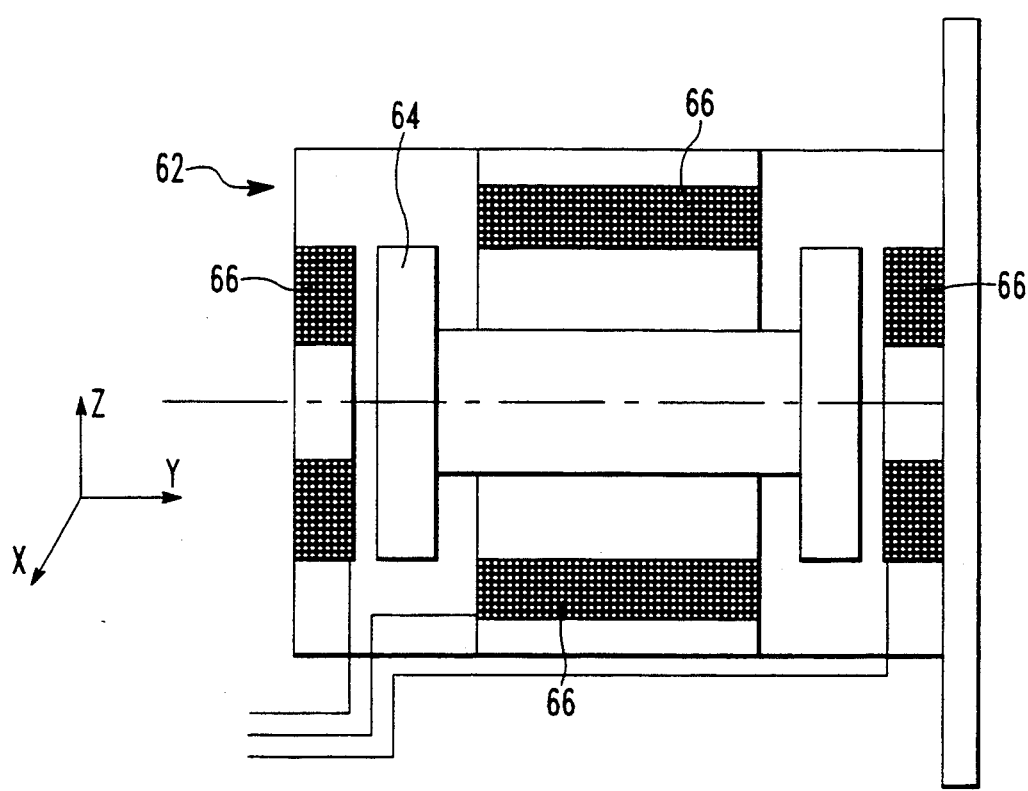
FIG. 3 is a section view through a preferred shaker mechanism.

FIGS. 1 and 2 illustrate application of the vibration cancellation apparatus 20 of the invention to a nuclear reactor coolant pump 30. It will be appreciated that the invention is also applicable to other electrical and electromagnetic apparatus driven via AC power. The coolant pump 30 comprises the combination of a centrifugal pump 32 and a motor 33, which can be mounted in various configurations and in the embodiment shown is mounted on a vertical rotation axis 35. The pump portion 32 at the bottom of the pump arrangement 30 has a housing coupled to inlet and outlet conduits 36, 38 and is mounted to a foundation 42 in a manner that causes the rotation axis 35 to extend upwardly from the foundation.

The motor 33 has a rotor coupled to an impeller arranged to rotate in the pump 32 for axial feed and tangential discharge of coolant. The rotor and impeller can be conventional, and are not shown in the drawings.

The effect of fluid variations and electric power variations produce vibrations in the pump/motor combination 30 as a whole, which vibrations are conveyed to the housing 44 of the pump 32 and motor 33, to the foundation 42 and to the inlet and outlet conduits 36, 38. Each of these elements contributes to airborne noise.

Vibrations may have a deleterious effect on the pump 32, motor 33 and any coupling seals or seals for isolating the pump from the motor along the rotor or impeller shafts. The pump/motor shaft bearings wear faster when subject to vibration, and vibration reduces the useful life of the seals associated with the motor, the conduits and additional conduits associated with cooling the pump itself (not shown). Vibration reduction is thus advantageous generally. However in connection with the present invention, vibration reduction is discussed primarily with reference to vibration leading to acoustic noise.

Vibration occurs in all axes where the pump/motor 30 and its housing 44 are subject to displacement or deformation. Fluid variations may produce axial displacement of the impeller and pump shaft. Rotational acceleration/deceleration, which occurs at harmonics of the rotational frequency and the line frequency, produces torsional vibration. Imbalances of the rotating elements of the arrangement produce lateral displacement vibration. Whereas the motor/pump 30 is mounted to the foundation 42 at the bottom, the vibrations may produce rotation with respect to one or another of the mounting posts 46, which vibration is coupled into torsional forces or displacements due to the inertial mass of the rotating impeller, shaft and motor rotor.

According to the invention, at least one multi-axis vibration sensor 50 is coupled to the machine 30 and operable to produce a signal representing vibration of the machine. The vibration sensor 50 preferably is arranged separately to encode acceleration along three mutually perpendicular axes, X, Y and Z, and can be arranged as three accelerometers, each appropriately aligned to one of the X, Y and Z axes. Where the pump/motor housing 44 is of a substantially solid construction, one set of three accelerometers will suffice. The accelerometers are preferably mounted remote from the attachment of the apparatus 30 to its foundation 42, thereby tending to maximize the vibration signals by placing the accelerometers at an area subjected to more substantial displacement with vibration than an area adjacent the foundation mounting.

The signal(s) representing vibration are coupled to a correction signal generator 55. The vibration signals typically include components at various frequencies, including integer multiples of the line frequency (including unity) and of the rotational frequency. The correction signal generator 55 also is coupled to the AC power line 58, whereby frequency and phase reference information are provided to the correction signal generator 55. The correction signal generator 55 produces an output signal representing vibration of the machine at least at one integer multiple of a frequency of the AC power line, and preferably is sensitive to vibration at a plurality of integer multiples, e.g., one to three.

The output of the correction signal generator 55 is coupled to a drive means 60 for an electromagnetic shaker 62 attached to the machine 30. Preferably, the correction signal generator 55 produces a three channel output, each of the channels being coupled through the drive means 60 to an electromagnetic shaker means 62 operable in one of three mutually perpendicular directions.

The shakers 62 each have a movable inertial mass 64 and a driving device for oscillating the inertial mass 64. The inertial mass 64 can be a ferrous weight, displaced by a drive means comprising an electromagnet coil 66 to which current is coupled by a driver circuit 72 coupled to the output of the correction signal generator 55. This driver circuit 72 is primarily a multi-channel amplifier that produces a current in the driver means or coil 66. The driver circuit 72 may include LC tuned circuits having bandpasses at the fundamental and harmonic frequencies of the line 58, for AC powered devices that operate at a specific frequency (e.g., 60 Hz). The respective harmonic outputs can be summed and applied to the drive means coil 66.

The driver circuit 72 is operable in conjunction with the correction signal generator 55 to cancel vibration of the machine 30 at the respective integer multiple(s) of the frequency of the AC power line 58 by oscillating the inertial mass 64 in synch with vibration detected by the vibration sensor accelerometer 50, and out of phase with the vibration detected. The amplitude of oscillation of the inertial mass 64 is controlled in a feedback loop 74 so as to seek minimum vibration as detected by the accelerometer 50, at each of the frequencies of interest, each of which is related to the power line frequency by an integer factor of one or more.

The drive means 60 of the electromagnetic shaker 62 is operable to produce independently controllable oscillation of the inertial mass 64 along three mutually perpendicular axes. This can be accomplished using a plurality of inertial masses that are individually mounted for movement along the respective axes, such as with three solenoids defining displacement axes in the X, Y and Z directions, each having a separate inertial mass coupled to a ferromagnetic plunger of the solenoid. Alternatively, a single ferromagnetic inertial mass can be acted upon by coils disposed along mutually perpendicular axes, as in the embodiment shown in FIG. 3.

At least two of said electromagnetic shakers 62 preferably are attached to the motor/pump housing 44 or other machine, at a distance from one another. The at least two electromagnetic shakers 62 are operable independently by the driver circuit 72 such that the shakers 62 can oscillate in phase or out of phase under control of the cancellation signal generator 55. In this manner, translational and torsional vibrations can be cancelled. Translational vibrations are cancelled by operating the shakers 62 on opposite sides of the housing 44 in phase with one another and out of phase with the translational vibration to be cancelled. Torsional vibrations are cancelled by operating the opposed shakers 62 out of phase with one another, and out of phase with the torsional vibration.

As shown in FIG. 2, at least four electromagnetic shakers 62 can be disposed substantially at 90° intervals around a rotation axis 35 of the machine 30. Each of the shakers 62 can be moved under control of the cancellation signal generator 55 in either direction along the X, Y and Z axes. The shakers 62 thus can be operated in various combinations and polarities, for cancelling or minimizing vibration in all degrees in which the motor/pump 30 or other device is subject to vibration with respect to the fixed foundation 42, e.g., due to any resilience of materials or mountings.

Preferably, cancellation of vibration is accomplished substantially independently for each of the mutually perpendicular axes. Certain forms of vibration, however, may appear in two of the axes defining a plane. For rotational vibration, for example, an unbalanced rotor may produce a vibratory sinusoidal variation in the X-Y plane. The cancellation signal generator 55 can be arranged to operate the shaker devices 62 such that an oscillation in a plane is cancelled by detecting the oscillation along one axis and operating the respective shakers 62 for both axes, with a phase difference to account for the sinusoidal progression of the force in the plane.

By discriminating for vibration at both the AC power line frequency and preferably at harmonics at multiples of the power line frequency, an improved vibration cancellation apparatus is obtained because the beating of rotational frequencies and power line frequencies is removed. The AC power line frequency cancellation apparatus 20 according to the invention thus is advantageously combined with a rotational frequency electromagnetic shaker or exciter mechanism.

To accomplish cancellation or reduction of vibration and accompanying acoustic noise, it is possible according to the invention to mount on the machine 30 a movable inertial mass 64 and means for oscillating the mass 64 to induce cancellation vibration of the machine 30, to sense vibration of the machine 30 in order to produce a signal representing vibration along at least one axis, to discriminate in the signal at least one frequency component of vibration in synch with and at least one integer multiple of a frequency of the AC power line, by comparison with a power signal of the AC power line, and to vibrate the movable inertial mass 64 in synch with the at least one integer multiple and out of phase therewith, so as to induce a vibration in opposition to the vibration along the at least one axis.

The vibration thereby cancelled does not add to the acoustic noise produced by any vibration due to rotation, and improves the effectiveness of any vibration reduction apparatus that may be coupled to deal with vibrations at rotational frequencies. Whereas cancelling rotational frequency vibrations may require sensors and the like that penetrate the housing of the machine and require access to the rotating shaft and/or impeller, cancelling the AC line frequency vibrations can be accomplished using sensors and electromagnetic shakers that are simply attached to the outside of the machine housing 44.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A vibration cancellation apparatus for minimizing vibration of a machine coupled to an AC power line., the vibration including at least one integer multiple of a frequency of the AC power line, said apparatus comprising:
    at least one vibration sensor coupled to the machine and operable to produce a signal representing vibration of the machine;
    a correction signal generator coupled to the signal representing vibration, the correction signal generator also being coupled to the AC power line and generating an output signal representing vibration of the machine at said at least one integer multiple of the frequency of the AC power line;
    an electromagnetic shaker attached to the machine, the shaker having a movable inertial mass and a drive means for oscillating the inertial mass; and,
    a driver circuit coupled to said drive means and to the output signal generated by the correction signal generator, the driver circuit being operable in conjunction with the correction signal generator to cancel vibration of the machine at the integer multiple of the frequency of the AC power line by oscillating the inertial mass in synch and out of phase with the vibration at said at least one integer multiple of the frequency of the AC power line.

2. The vibration cancellation apparatus according to claim 1, wherein the drive means of the electromagnetic shaker is operable to produce independently controllable oscillation of the inertial mass along three mutually perpendicular axes.

3. The vibration cancellation apparatus according to claim 2, comprising at least two of said electromagnetic shaker apparatus attached to the machine at a distance from one another, the at least two electromagnetic shaker apparatus being operable independently by the driver circuit such that the shaker apparatus can oscillate in phase and out of phase, whereby translational and torsional vibrations are cancelled.

4. The vibration cancellation apparatus according to claim 2, comprising at least four said electromagnetic shaker apparatus disposed substantially at 90° intervals around a rotation axis of the machine.

5. The vibration cancellation apparatus according to claim 2, wherein the vibration sensor comprises an accelerometer operable to sense vibration in mutually perpendicular axes, and wherein the correction signal generator and the driver means comprise multi-channel circuits operable to cancel vibration along said mutually perpendicular axes.

6. An improved vibration cancellation apparatus with an electromagnetic exciter mechanism operable to sense and counteract vibration at a rotational frequency of a rotating machine coupled to an AC power line, the machine vibrating at frequency components related to the rotational frequency and also at frequency components related to an AC power line frequency, the improvement comprising:
    means for producing a signal representing vibration of the machine at the AC power line frequency;
    a correction signal generator coupled to said means for producing the signal representing vibration, the correction signal generator producing an output signal representing vibration of the machine at least at one integer multiple of a frequency of the AC power line;
    an electromagnetic shaker attached to the machine, the shaker having a movable inertial mass and a drive means for oscillating the inertial mass; and,
    a driver circuit coupled to said drive means and to the output signal generated by the correction signal generator, the driver circuit being operable in conjunction with the correction signal generator to cancel vibration of the machine at the integer multiple of the frequency of the AC power line by oscillating the inertial mass in synch and out of phase with the vibration, whereby the vibration cancellation apparatus cancels sideband vibrations at a sum and difference of the rotational and AC power line frequencies.

7. The improved vibration cancellation apparatus according to claim 6, wherein the drive means of the electromagnetic shaker is operable to produce independently controllable oscillation of the inertial mass along three mutually perpendicular axes.

8. The improved vibration cancellation apparatus according to claim 7, comprising at least two of said electromagnetic shaker apparatus attached to the machine at a distance from one another, the at least two electromagnetic shaker apparatus being operable independently by the driver circuit such that the shaker apparatus can oscillate in phase and out of phase, whereby translational and torsional vibrations are cancelled.

9. The improved vibration cancellation apparatus according to claim 7, comprising at least four said electromagnetic shaker apparatus disposed substantially at 90° intervals around a rotation axis of the machine.

10. The improved vibration cancellation apparatus according to claim 7, wherein the vibration sensor comprises an accelerometer operable to sense vibration in mutually perpendicular axes, and wherein the correction signal generator and the driver means comprise multi-channel circuits operable to cancel vibration along said mutually perpendicular axes.

11. A method for reducing vibration of a rotating machine coupled to an AC power line, comprising the steps of:
  mounting on the machine a movable inertial mass and means for oscillating the mass to induce vibration of the machine;
  sensing vibration of the machine to produce a signal representing vibration along at least one axis;
  discriminating in the signal at least one frequency component of vibration in synch with and at least one integer multiple of a frequency of the AC power line, by comparison with a power signal of the AC power line;
  vibrating the movable inertial mass in synch with the at least one integer multiple and out of phase therewith, so as to induce a vibration in opposition to the vibration at said at least one integer multiple of the frequency of the AC power line, along the at least one axis.

* * * * *